US006289204B1

(12) United States Patent
Estes et al.

(10) Patent No.: US 6,289,204 B1
(45) Date of Patent: Sep. 11, 2001

(54) INTEGRATION OF A RECEIVER FRONT-END IN MULTILAYER CERAMIC INTEGRATED CIRCUIT TECHNOLOGY

(75) Inventors: John Estes; Rong-Fong Huang; Rich Kommrusch, all of Albuquerque, NM (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/112,733

(22) Filed: Jul. 9, 1998

(51) Int. Cl.[7] .................................................. H04B 1/44

(52) U.S. Cl. .............................. 455/78; 455/81; 455/281; 455/300; 333/103; 333/134

(58) Field of Search ................................ 455/78, 80, 81, 455/82, 83, 114, 127, 129, 280, 281, 282, 291, 292, 73, 300; 333/103, 104, 134, 185, 246, 247, 120, 128

(56) References Cited

U.S. PATENT DOCUMENTS

| | | | | |
|---|---|---|---|---|
| 5,109,536 | * | 4/1992 | Kommrusch | 455/82 |
| 5,426,404 | | 6/1995 | Kommrusch et al. . | |
| 5,467,064 | * | 11/1995 | Gu | 333/128 |
| 5,499,005 | | 3/1996 | Gu et al. . | |
| 5,513,382 | * | 4/1996 | Agahi-Kesheh et al. | 455/83 |
| 5,584,053 | | 12/1996 | Kommrusch et al. | 455/82 |
| 5,789,995 | * | 8/1998 | Minasi | 455/83 |
| 5,896,563 | * | 4/1999 | Kawanami et al. | 455/82 |
| 5,903,820 | * | 5/1999 | Hagstrom | 455/82 |
| 5,999,065 | * | 12/1999 | Furutani et al. | 333/103 |

* cited by examiner

*Primary Examiner*—Lester G. Kincaid
(74) *Attorney, Agent, or Firm*—Gary J. Cunningham; William E. Koch

(57) ABSTRACT

A multilayer ceramic integrated circuit module for a receiver front-end of a wireless communication device is provided. The module contains an embedded component portion, which has a plurality of thick film capacitors; a plurality of multilayer capacitors; and a plurality of transmission lines deposited internal to the multilayer ceramic integrated circuit module to interconnect the plurality of thick film capacitors and the plurality of multilayer capacitors. The module also contains a mounted component portion, which has a pair of pin diodes; a transistor and a plurality of resistors coupled thereto, for controlling the bias of the pair of pin diodes; and a low-noise-amplifier. The module reduces the size and weight of wireless devices and combines multiple functions into a highly integrated device.

5 Claims, 6 Drawing Sheets

TOP LEVEL VIEW OF THE TWO DIMENSIONAL LAYOUT OF THE INTEGRATED RECEIVER FRONT-END

-PRIOR ART-

TOP LEVEL VIEW OF THE TWO DIMENSIONAL LAYOUT OF THE INTEGRATED RECEIVER FRONT-END

TRANSMISSION LINE COILED ABOUT VERTICAL AXIS

TRANSMISSION LINE COILED ABOUT HORIZONTAL AXIS

ELECTRICAL RESPONSE OF THE T/R SWITCH

ELECTRICAL RESPONSE OF THE LOW SIDE NOTCH FILTER

ELECTRICAL RESPONSE OF THE BANDPASS FILTER

ELECTRICAL RESPONSE OF THE IMAGE FILTER

ELECTRICAL RESPONSE OF THE INTEGRATED RECEIVER FRONT-END

INTEGRATION OF A RECEIVER FRONT-END IN MULTILAYER CERAMIC INTEGRATED CIRCUIT TECHNOLOGY

FIELD OF THE INVENTION

This invention relates to the front end of wire less communication devices, and more particularly, to the integration of a receiver front-end in multilayer ceramic integrated circuit technology.

BACKGROUND OF THE INVENTION

The commercial wireless industry continues to drive for size, weight, and cost reduction of wireless devices, while at the same time driving the performance enhancement of these devices. Significant progress has been made in the integration and size reduction of frequency processing functions in semiconductor products, but the integration of frequency selective devices that require many passive components has lagged. Efforts are underway to integrate passive components into organic printed circuit boards, but frequency selective devices, such as VCOs and filters, require higher quality (Q) components than the typical PCBs can deliver.

Multilayer Ceramic Integrated Circuits (MCIC), utilizing a low temperature co-fired materials system, has proven that high Q passive components can be integrated in this technology to form individual devices such as transmit/receive (T/R) switches and filters.

While MCIC has made a dent in the size and weight reduction of wireless devices, its significant impact occurs when multiple functions are combined into the integrated circuit. Recently, the integration of a major portion of a wireless radio's receiver front-end into a single MCIC unit has been demonstrated.

FIG. 1 shows a block diagram of the major components of a typical radio transmit/receive front-end. These front-end components include filters, mixers, voltage controlled oscillators (VCOs), amplifiers, a switch or duplexer and an antenna. In addition to these major components, there are a myriad of smaller components, such as resistors, capacitors, and inductors, as well as transmission lines that provide support functions. These support functions include biasing, coupling, and blocking. In accordance with the prior art design techniques, these various components are oftentimes discretely placed on the radio printed circuit board.

The placement of transmission lines between stacked sheets of dielectric has been known to designers in the relevant art. For example, Gu et al. taught of a Transmission line device Using Stacked Conductive Layers in U.S. Pat. No. 5,499,009 (issued Mar. 12, 1996), and Kommrusch et al. taught of a Commonly Coupled High Frequency Transmitting/Receiving Switching Module in U.S. Pat. No. 5,584,053 (issued Dec. 10, 1996). Similarly, R. F Huang and R. Kommrusch presented "The Development of a Multilayer Ceramic Antenna Switch for Wireless Communications" at the Proceedings of the Symposium on Materials and Processes for Wireless Communications, Boston, Mass. (Nov. 15–17, 1994). These patents and this paper, to the extent necessary are incorporated herein by reference.

Referring to FIG. 1 in detail, the typical components of a radio's RF front end are provided in block diagram 100. A signal is received through an antenna 102 and first encounters a lowpass filter 104. Next, the signal encounters a transmit/receive switch 106 which may be in a first or a second position. One possible path for the signal involves passing through an oscillator 114, a mixer 112, a power amplifier 110 and then a power driver 108. An alternative path for the signal involves passing through a bandpass filter 116, a low noise amplifier (LNA) 118, a bandpass filter 120, an amplifier 122, a bandpass filter 124, a mixer 126 and an oscillator 128. In either event, it is evident that various components and functions are needed to properly control the signal in a radio RF front end.

A ceramic multilayer package module which incorporates a Transmit/Receive (T/R) switch with a harmonic filter, two band reject filters, one bandpass filter, an impedance matching network, bias circuitry, and a low noise amplifier and which is small in size in the order of approximately 500 mils by approximately 500 mils by approximately 90 mils and which contained approximately 44 embedded passive components and contained approximately 11 components mounted on its top surface and which doubled component density over previous designs, would be considered an improvement in the art.

DETAILED DESCRIPTION OF A PREFERRED EMBODIMENT

The integration of various components and functions into a single multilayer ceramic integrated circuit package provides significant advantages in achieving size, weight, and cost reductions, while at the same time driving performance enhancements. Through integration, many other advantages are realized. These include reduced parts count, lower assembly costs, faster assembly time, higher reliability, reduced radiated emissions, and reduced quality control (QC) procedures.

The integrated radio front-end receiver using MCIC technology of the present invention incorporates many functions including a transmit/receive (T/R) switch with a harmonic filter, a low side notch filter, a biasing circuit, an impedance matching circuit, a bandpass filter, and an image reject filter. Collectively, these functions comprise a major portion of the RF function of the radio.

Figure 1:
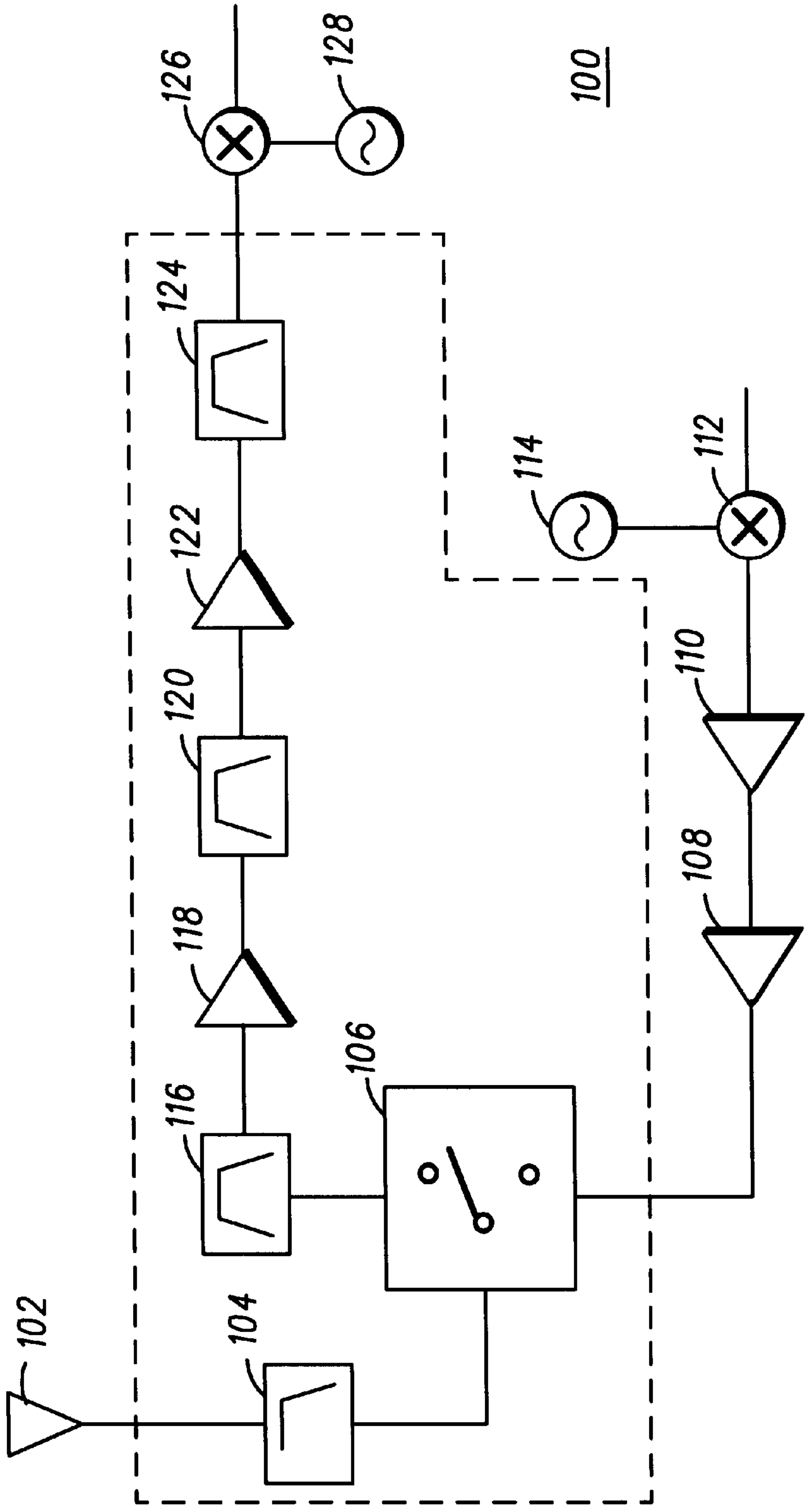
FIG. 1 shows a block diagram of typical components of a radio's RF front-end in accordance with the prior art.
Figure 2:
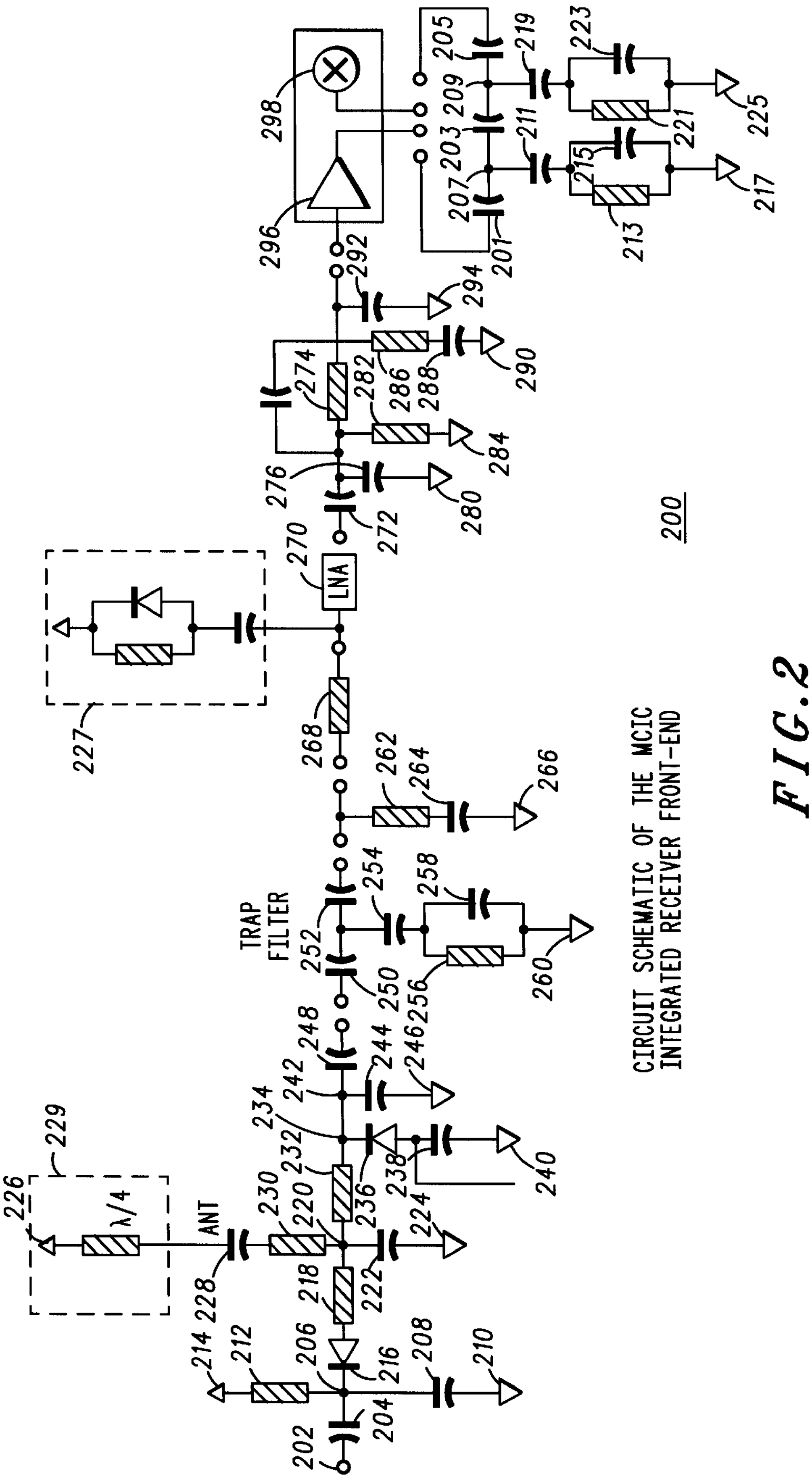
FIG. 2 shows a circuit schematic of the MCIC integrated receiver front-end in accordance with the present invention.

FIG. 2 shows the circuit schematic for the integrated receiver front-end in accordance with the present invention. Twelve transmission lines and thirty-two capacitors have been embedded into the ceramic structure. Five capacitors, which are not shown, provide RF shorts for the bias lines of the low noise amplifier (LNA). Two diodes for the switch and a LNA are mounted on the top surface of the MCIC unit while the second amplifier and mixer are mounted on the transceiver's PC board. In addition to the diodes and LNA, eight other components are mounted on the top surface of the MCIC device. These components include five bias resistors for the LNA, a current limiting resistor for the switch diodes and two FETs, one to turn on the LNA and the other to enable the transmit side of the T/R switch. These will be discussed in detail in FIG. 3 below.

Referring to FIG. 2 in detail, a circuit schematic of the MCIC integrated receiver front end is provided. This figure details, in a clear schematic format, the level of integration which is achieved in the present invention. In FIG. 2, a circuit schematic 200 is provided. FIG. 2 contains a transmit (Tx) port 202 coupled to capacitor 204. Next is a node 206 which has a capacitor 208 to ground 210 and a transmission line 212 to ground 214. A diode 216 is positioned after node 206 and before transmission line 218. Transmission line 218 is coupled to node 220 which is coupled to ground 224 through capacitor 222. Antenna port 226 is connected to node 220 through capacitor 228 and transmission line 230; Another transmission line 232 couples node 220 with node 234. A switch bias is coupled-to node 234 through a diode 236 and a capacitor 238 coupled to ground 240. Node 234 is coupled to node 242 which has a capacitor 244 to ground 246 extending threrefrom. Capacitor 248 is coupled to node 242.

Another integrated feature which is shown in the schematic of FIG. 2 is the trap filter which comprises capacitors 250, 252, and 254, as well as a transmission line 256 and a capacitor 258 connected in parallel to ground 260. The circuit 200 also contains an LNA bias network which contains a transmission line 262 and a capacitor 264 connected to ground 266. The LNA bias network is coupled to the low noise amplifier (LNA) 270 through a transmission line 268. LNA 270 is coupled to a capacitor 272 and transmission line 274. Also included is a capacitor 276 to ground, a transmission line 282 to ground 284, a transmission line 286 and a capacitor 288 to ground 290, and a capacitor 292 to ground 294 which collectively define a bandpass filter.

One final aspect of the circuit shown in FIG. 2 is an image filter which comprises an amplifier 296 and a mixer 298 which are coupled to capacitors 201, 203, and 205. Extending therefrom are a first leg starting at node 207 and second leg starting at node 209. The first leg comprises capacitor 211 coupled to a transmission line 213 which is connected in parallel to capacitor 215, both of which are connected to ground 217. Similarly, the second leg comprises capacitor 219 coupled to a transmission line 221 which is connected in parallel to capacitor 223, both of which are connected to ground 225.

In one preferred embodiment of the present invention, the multilayer ceramic integrated circuit module for a receiver front-end module 200 may advantageously further comprise a limiter diode 227 for providing shielding protection from power surges for the low noise amplifier. The limiter diode 227 is shown as a dashed-line region in FIG. 2.

In another preferred embodiment of the present invention, the multilayer ceramic integrated circuit module for a receiver front-end 200 may advantageously further comprise a quarter-wavelength transmission line 229, connected to ground, for providing protection against electrostatic discharge. This quarter-wavelength transmission line 229 is shown as a dashed-line region in FIG. 2.

Figure 3:
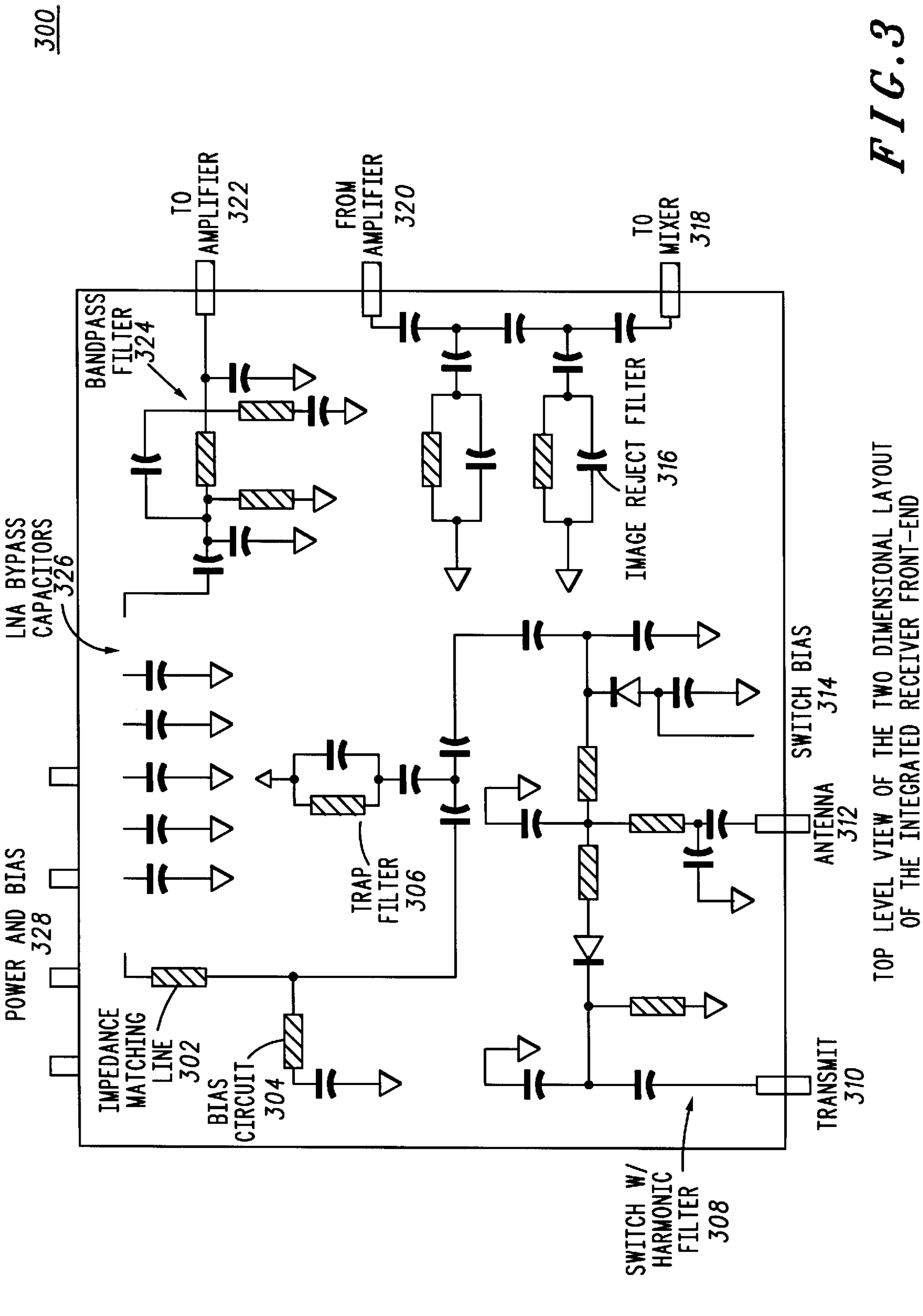
FIG. 3 shows a top level view of the two dimensional layout of the integrated receiver front-end in accordance with the present invention.

FIG. 3 shows a top level view of the two-dimensional layout of the integrated receiver front-end portion a cellular telephone or the like. Referring to FIG. 3 in detail, a top view of the receiver front end in MCIC is provided as numeral 300. This view shows an impedance matching line 302 which is coupled to a bias circuit 304. Other circuit components which can be viewed from FIG. 3 include a trap filter 306 as well as a switch with a harmonic filter 308. A transmit port 310 and an antenna port 312 are provided along one side of the MCIC package 300. Moreover, a switch bias 314 and an image reject filter 316 are also provided. On another side surface of the MCIC package, a port to mixer 318 and a port from amplifier 320 are also provided, along with a port to amplifier 322. FIG. 3 also shows bandpass filter 324 along with low noise amplifier (LNA) bypass capacitors 326. Finally, power and bias ports 328 are provided on another side surface of the front end in MCIC 300.

FIG. 3 shows clearly the complexity and design challenges involved with integrating the receiver front end of the radio. FIG. 3 shows a top level view of how the different functions of the integrated receiver front end have been laid out in the ceramic substrate. Forty-four (44) components have been embedded in a 500 mil by 500 mil by 90 mil ceramic substrate along with eleven (11) components mounted on the top surface. This works out to a component density of thirty-four (34) per square centimeter which is twice the density of the prior art.

The area of the substrate was constrained by footprint compatibility. In other words, the area was left purposefully larger than necessary in order to accommodate a predetermined footprint pattern on the circuit board. Without this constraint, the part (the MCIC multilayer package) most likely could have been reduced in size even more to four hundred (400) mils by four hundred (400) mils. This would result in a component density of fifty-three (53) per square centimeter.

The substrate, as shown in FIG. 3, has been divided into a direct current (dc) and a radio frequency (RF) section using an embedded ground plane. The RF components are advantageously embedded between two ground planes which provide RF shielding. The top ground plane is buried under two layers of ceramic. It is in the top two layers that the dc bias and control lines are located. Of course, the pads for mounting the surface components are also located on the top layer of the part.

Size reduction has been implemented by taking advantage of the layering of the MCIC technology to create three dimensional type transmission lines and multilayered capacitors. Additionally, co-firable dielectric paste has been used to create large value capacitors on a single layer thereby allowing multiple capacitors to be integrated in the same vertical area.

Figure 4:
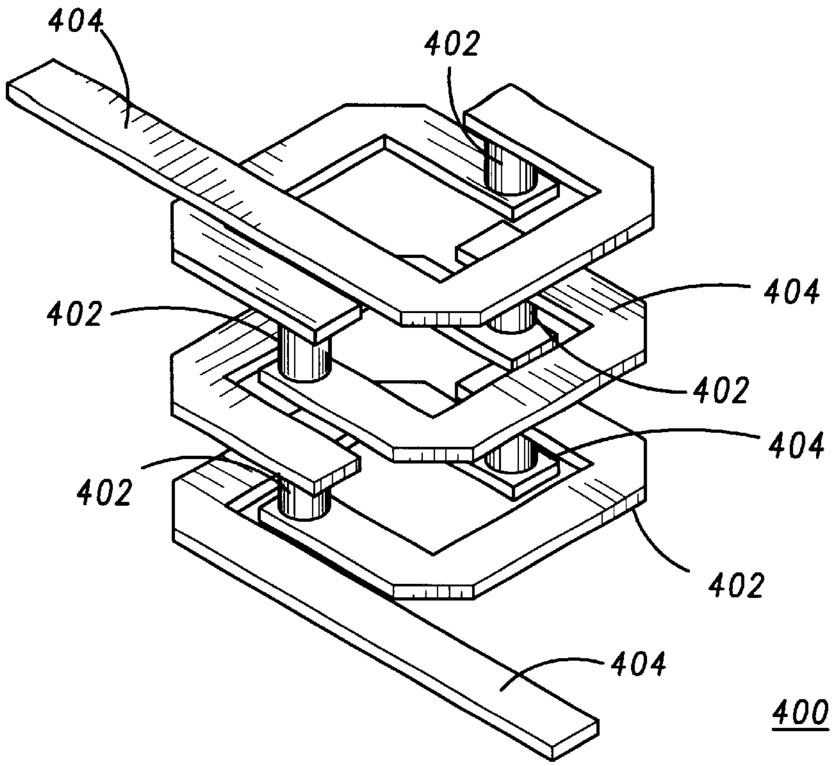
FIG. 4 shows a transmission line coiled about a vertical axis, a feature of the present invention.

Still another novel aspect of the present invention involves the clever methods by which transmission lines are wound through the package. In the MCIC part, two different types of three-dimensional transmission lines are employed in the component. Bias lines are usually implemented using a transmission line that is coiled about its vertical axis. An embodiment of this type of transmission line is shown in FIG. 4. Referring to FIG. 4, a transmission line 400, coiled about its vertical axis is provided. Transmission line 400 contains a vertical component 402 as well as a horizontal component 404.

While technically this is not a true transmission line, it may be modeled as a transmission line over a narrow frequency band which covers the frequency of interest of this receiver. In an 80 mil thick package with a dielectric loss tangent of 0.002, these transmission lines (as shown in FIG. 4) have been built with a characteristic impedance ranging from about 60 to about 90 and Q-values which range from about 70 to about 110 at 900 MHz. These values prove to be more than adequate for the applicant's intended application as a front-end receiver circuit for a radio device such as a cellular telephone and the like.

Figure 5:
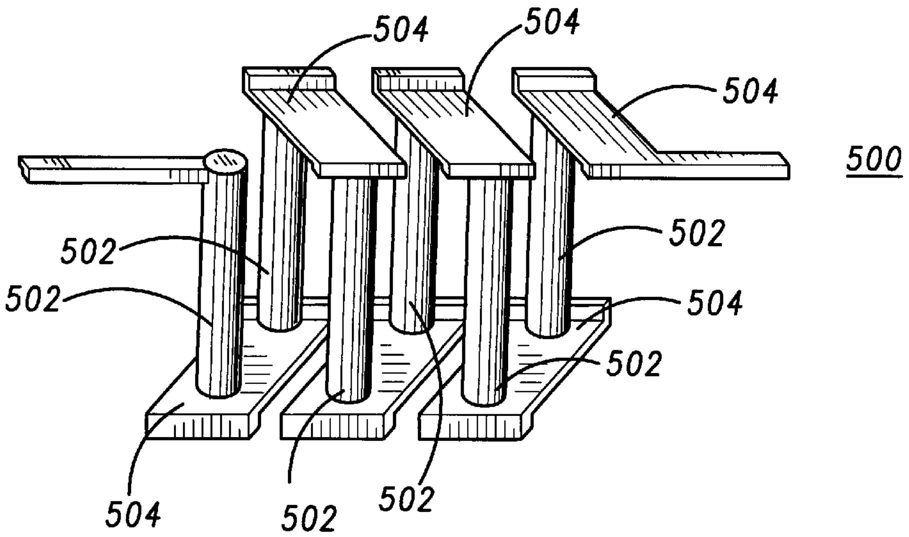
FIG. 5 shows a transmission line coiled about a horizontal axis, a feature of the present invention.

Another type of transmission line, which is coiled about the horizontal axis, is provided in FIG. 5. In the MCIC part, all three filters employ a transmission line that is coiled about its horizontal axis. FIG. 5 shows a representation of this type of transmission line. Referring to FIG. 5, a transmission line 500, coiled about its vertical axis is provided. Transmission line 500 contains a vertical component 502 as well as a horizontal component 504.

In an eighty (80) mil thick package with a dielectric loss tangent of 0.002, these transmission lines (such as the one shown in FIG. 5) have been built with a characteristic impedance ranging from about 30 to about 60 and Q-values which range from about 90 to about 130 at 900 MHz. These values prove to be more than adequate for applicant's intended application as a front-end receiver circuit for a radio device. Thus, by employing both types of transmission line designs in the MCIC package, the designers are able to further reduce size, volume, weight, part count, and the like.

Another advantage of the present invention involves the use of a custom formulated dielectric paste therewith. By using a screen printable paste with a dielectric constant of about 20 and a single print thickness of approximately 0.6 mils, a fifteen fold (15×) increase in capacitance can be achieved using the same metal plate area. This allows for the reduction in either metal plate area or the number of layers needed to build capacitors. There is a limit, however, in using the screen printable paste due to the variation in print thickness. Due to this limitation, only capacitors without tight tolerances, such as blocking and bypass capacitors may be designed with the printable paste. In the present design, almost half of the capacitors were able to be designed using the screen printable paste.

Figure 6:
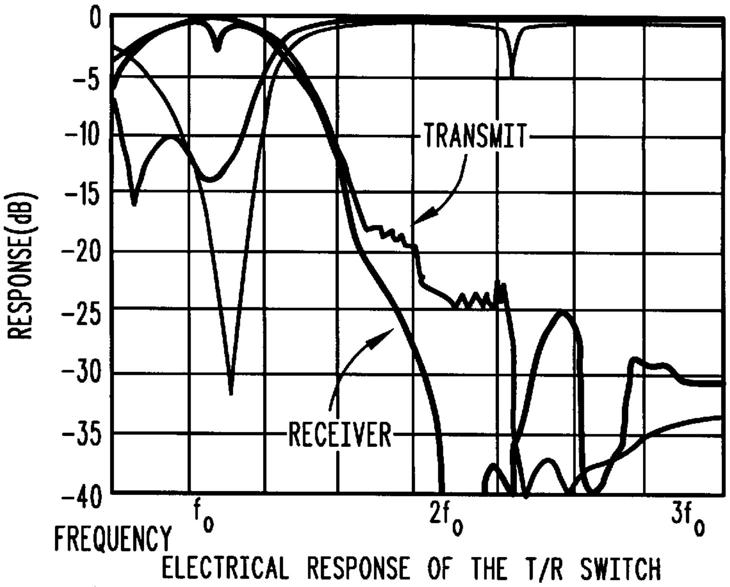
FIG. 6 shows a graph of the electrical response of the T/R switch in accordance with the present invention.

The effect of intensive integration on the electrical performance of the MCIC part proved to be very favorable. This is shown with review of the electrical graphs provided as FIGS. 6 through 10. FIG. 6 shows the electrical response of the T/R switch. Referring to FIG. 6, the frequency is measured along the horizontal axis and varies between the fundamental frequency (fo) and the third harmonic (3fo). The response (insertion loss) is measured in decibels (dB) along the vertical axis and varies between 0–40 dB.

FIG. 6 shows the electrical response of the transmit/receive (T/R) switch of the integrated module (also referred to as the multilayer package, the part, the component, and the MCIC integrated circuit device). An insertion loss of less than 0.5 dB is observed in each path and a harmonic rejection value of at least 20 dB is achieved. The "transmit" response is labeled as the upper response curve and the "receive" response is similarly labeled as the lower response curve.

Figure 7:
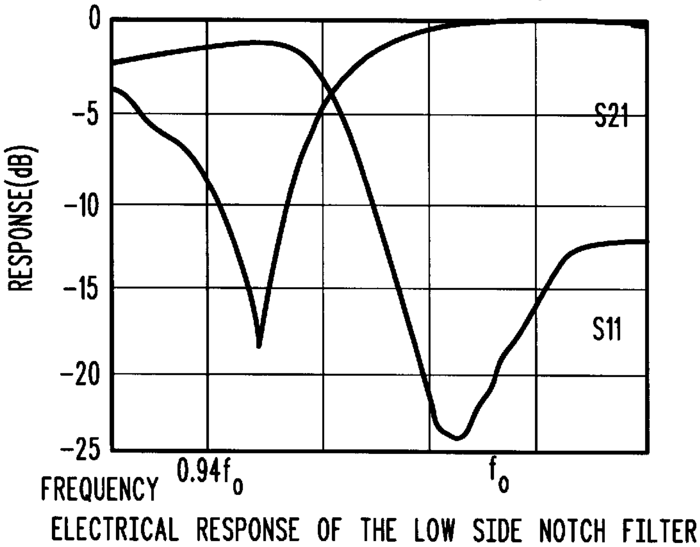
FIG. 7 shows a graph of the electrical response of the low side notch filter in accordance with the present invention.

FIG. 7 shows the response of the low side notch filter which follows the receive portion of the T/R switch. This notch filters a potential interference frequency. Referring to FIG. 7, the frequency is measured along the horizontal axis and varies around the fundamental frequency (fo). The response (insertion loss) is measured in decibels (dB) along the vertical axis and varies between 0–25 dB. Referring to FIG. 7, it may be seen that the passband insertion loss of this filter is less than 0.4 dB and the filter has a rejection (insertion loss) of at least 15 dB at 0.94 fo.

Figure 8:
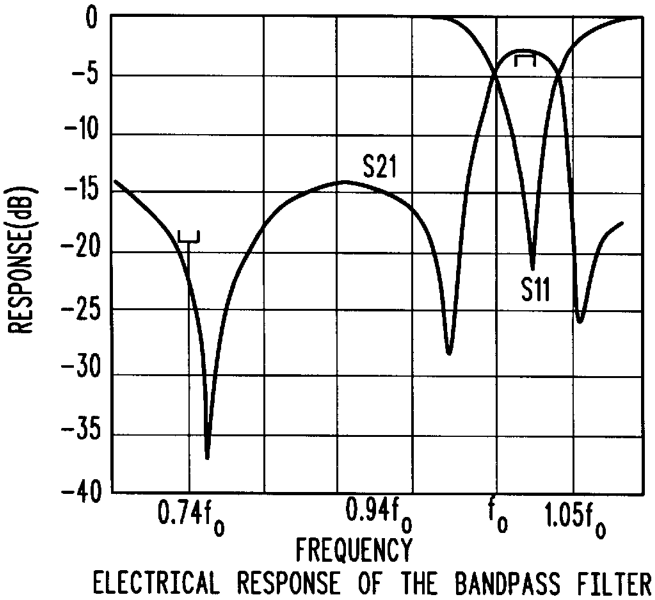
FIG. 8 shows a graph of the electrical response of the bandpass filter in accordance with the present invention.

FIG. 8 shows the response of the bandpass filter which follows the low noise amplifier (LNA). Referring to FIG. 8, the frequency is measured along the horizontal axis and varies around the fundamental frequency (fo) from 0.74 fo to 1.05 fo. The response (insertion loss) is measured in decibels (dB) along the vertical axis and varies between 0–40 dB. In FIG. 8, the bandpass filter has a passband insertion loss of less than 2.5 dB. This filter also exhibits rejections of greater than 20 dB at 0.74 fo, greater than 28 dB at 0.94 fo and greater than 25 dB at 1.05 fo. All of these values clearly exceed the required specifications for the bandpass filter.

Figure 9:
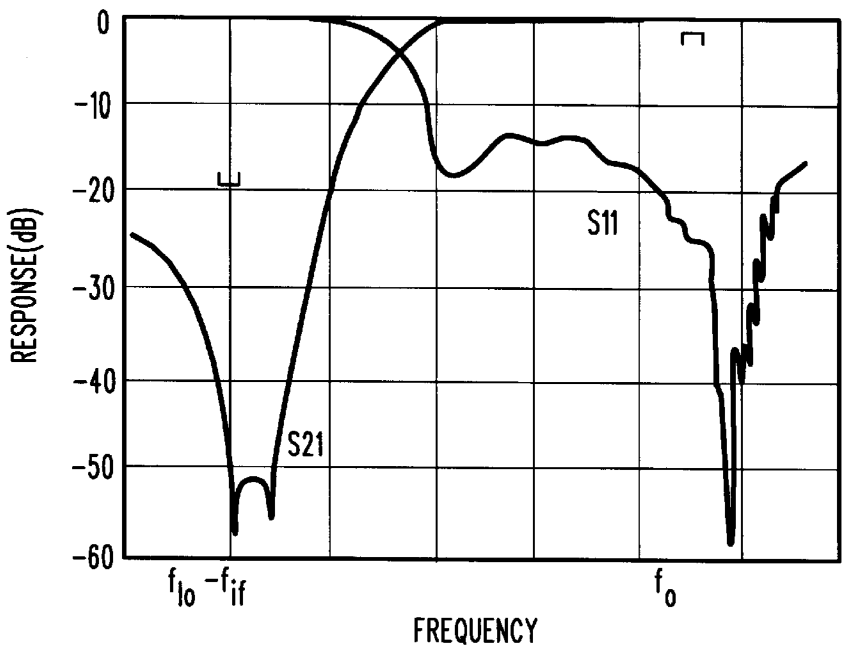
FIG. 9 shows a graph of the electrical response of the image filter in accordance with the present invention.

FIG. 9 shows the response of the image reject filter which follows the second amplifier and which precedes the first mixer. Referring to FIG. 9, the frequency is measured along the horizontal axis and varies around the fundamental frequency (fo). The response (insertion loss) is measured in decibels (dB) along the vertical axis and varies between 0–60 dB. In FIG. 9, the image reject filter has a passband insertion loss of less than 0.4 dB and may have a rejection (insertion loss) greater than 50 dB at the image frequency with a slight adjustment in the design. The specifications for the image reject filter are a passband insertion loss of less than 2 dB and a rejection at the image of greater than 20 dB.

Another interesting aspect of the present invention is that a second zero was added to the filter at the image frequency to make the filter tuneless. Obviously this filter is overdesigned and could be redesigned to further reduce the size of the MCIC package. Nevertheless, the values achieved for the image reject filter exceeded the required specifications for the image reject filter.

Figure 10:
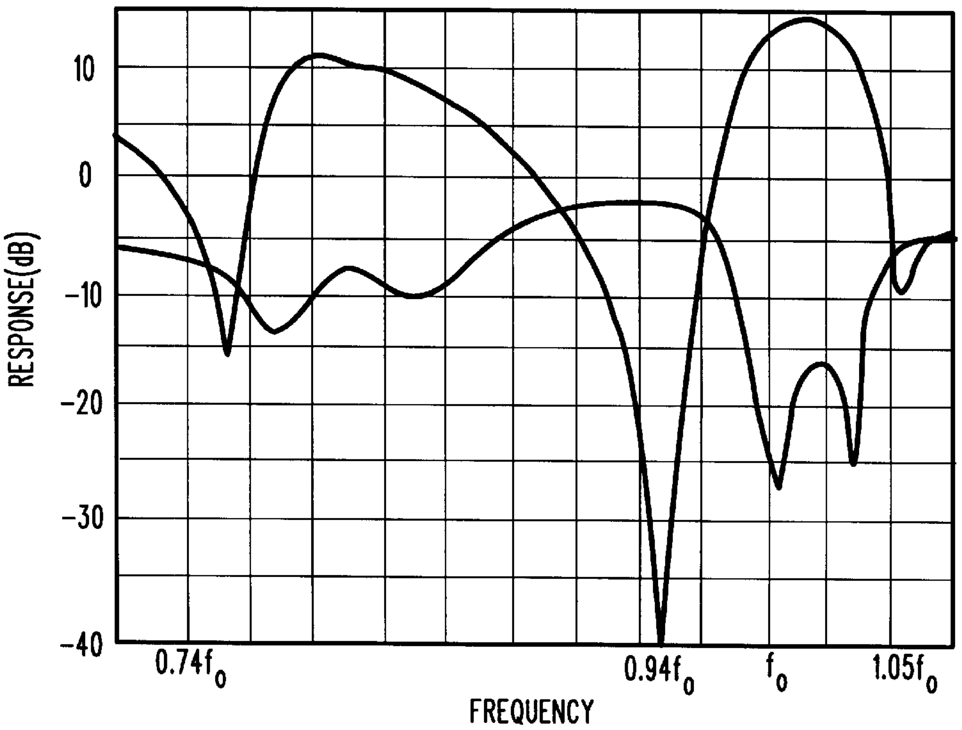
FIG. 10 shows a graph of the electrical response of the integrated receiver front-end in accordance with the present invention.

FIG. 10 shows the electrical response of the integrated receiver front-end minus the image reject filter (the electrical response of the integrated receiver front-end). Referring to FIG. 10, the frequency is measured along the horizontal axis and varies around the fundamental frequency (fo) from 0.74 fo to 1.05 fo. The response (insertion loss) is measured in decibels (dB) along the vertical axis and varies between 0–40 dB. As can be seen from the graph, the integrated receiver front-end is performing as desired. The current LNA being used has a gain of approximately 17 dB and the overall gain of the integrated receiver is a remarkable 13 to 14 dB.

In summary, the integration of a major portion of an RF's radio receiver front end in MCIC technology has been successfully demonstrated. In a ceramic multilayer package having dimensions of 500 mils by 500 mils by a height of 90 mils, a component density of 34 per square centimeters has been achieved, which has resulted in a two-fold increase in the component density over pervious designs. This package contains 44 embedded components and 11 surface mounted components, greatly exceeding all previous designs. Moreover, the range of functions that has been integrated into this miniature package is phenomenal. These include a T/R switch with a harmonic filter, a low side notch filter, a bandpass filter, an image filter, an impedance matching circuit and bias circuitry. In addition, the LNA has been integrated into the package providing a level of integration unprecedented in radio architecture design.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A multilayer ceramic module housing a receiver front-end of a wireless communication device, comprising:

first ceramic material including at least two layers;

dc bias circuitry and control lines embedded within the first ceramic material;

second ceramic material including a plurality of layers;

radio frequency devices including receiving and transmitting electronic devices, embedded within the second ceramic material; and a first embedded ground plane, for providing RF shielding, positioned between the dc bias circuitry and control lines and the radio frequency devices, wherein the radio frequency devices include a three dimensional transmission line comprising a plurality of layered components, each located between layers of the second ceramic material; and at least two connecting components within the second ceramic material connected to each of the layered components.

2. The multilayer ceramic module housing a receiver front-end of a wireless communication device of claim 1, further comprising:

a second embedded ground plane, for providing RF shielding, located on an opposed side of the radio frequency devices from the first embedded ground plane.

3. The multilayer ceramic module housing a receiver front-end of a wireless communication device of claim 1, wherein the radio frequency devices include a transmit/receive switch having a harmonic filter, a low side notch filter, a biasing circuit, an impedance matching circuit, a bandpass filter, and an image reject filter.

4. The multilayer ceramic module housing a receiver front-end of a wireless communication device of claim 1, wherein the radio frequency devices include a three dimensional transmission line comprising:

a first plurality of layered components located between a first pair of layers of the second ceramic material;

a second plurality of layered components located between a second pair of layers of the second ceramic material;

a plurality of connecting components within the second ceramic material, each connecting one of the first layered components to one of the second layered components.

5. The multilayer ceramic module housing a receiver front-end of a wireless communication device of claim 1, wherein the radio frequency devices include a three dimensional transmission line comprising:

first and second layered components located between a first pair of layers of the second ceramic material;

third and fourth layered components located between a second pair of layers of the second ceramic material;

a first connecting component within the second ceramic material connecting the first and third layered components;

a second connecting component within the second ceramic material connecting the first and fourth layered components; and a third connecting component within the second ceramic material connecting the second and fourth layered components.

* * * * *